3,312,654
COPOLYMERS CONTAINING HYDROXYALKYL ETHER ESTERS OF UNSATURATED ACIDS, AND COATING COMPOSITIONS CONTAINING SAME

Ivor Pratt, Avon, Ohio, and Edward T. Turpin, Oakville, Ontario, Canada, assignors to The Glidden Company, Cleveland, Ohio, a corporation of Ohio
No Drawing. Filed Feb. 12, 1962, Ser. No. 172,753
7 Claims. (Cl. 260—33.4)

This invention relates to acidic and/or neutral copolymers containing:

(a) Hydroxyalkyl esters of copolymerizable ethylenically-unsaturated carboxylic acids and/or
(b) Hydroxyalkyl ether esters of asid copolymerizable acids, and it relates more particularly to improved baking-type surface coating compositions (clear or pigmented) wherein said copolymer(s) provide a portion of the resinous materials which become thermoset when baked. The hydroxyalkyl groups of said esters and/or ether esters are derived from ethylene oxide and/or propylene oxide, and can be provided in four ways; namely:

(1) By condensing one mol of selected alkylene oxide(s) with one equivalent of selected unsaturated acid(s), whereby monomeric hydroxyalkyl esters are formed for subsequent polymerization with desired copolymerizable monomers;

(2) By condensing more than one mol of selected alkylene oxide(s) with one equivalent of selected unsaturated acid(s), whereby monomeric hydroxyalkyl ether esters are formed (in preference to hydroxyalkyl esters) for subsequent polymerization with selected copolymerizable monomers;

(3) By preparing acidic copolymers through copolymerization of selected unsaturated, copolymerizable acid(s) with other monomeric materials(s), preferably containing a $CH_2=C<$ group, and (a) Then condensing selected alkylene oxide(s) with some or all of the carboxyl groups in the copolymers, such that the molar ratio of alkylene oxide(s) to esterfied carboxyls is about one to one, whereby hydroxyalkyl esters of the participating carboxyls are formed, or (b) Then condensing selected alkylene oxide(s) with some or all of the carboxyl groups in the copolymers, such that the molar ratio of alkylene oxide to esterfied carboxyls is more than one to one, whereby hydroxyalkyl ether esters of the participating carboxyls are formed in preference to hydroxyalkyl esters.

Thus, our desired copolymers which contain reactive hydroxyalkyl groups can be prepared in either of two ways; namely, (a) By first preparing the hydroxyalkyl-terminated monomeric esters and/or half esters and subsequently copolymerizing them with selected acidic and/or neutral materials containing ethylenic unsaturation, preferably a $CH_2=C<$ group, or (b) By first preparing a desired copolymer containing selected carboxylic acid(s) and then hydroxyalkylating said copolymers to secure the desired hydroxyalkyl groups (with or without residual unesterified carboxyl groups).

Accordingly, the copolymers to which the invention pertains can be neutral copolymers in the sense that no unesterfied carboxyl groups remain, or they can be acidic in that only a portion of the available carboxyl groups have been hydroxyalkylated. In either case the resulting copolymers are potentially reactive (a) by reason of the presence of terminal (i.e. primary or secondary) hydroxyl groups in the hydroxyalkyl groups or (b) by reason of the presence of both said hydroxyl groups and unesterfied carboxyl groups. Accordingly the reactive hydroxyalkyl groups described above correspond to the formula $$HOR(OR^1)_nO—$$

wherein R and $R^1$, are divalent hydrocarbyl groups of 2–3 carbon atoms and can be the same or different and wherein $n$ is an integer between 2 and 8. Such groups are ester-linked to the finished copolymers of the invention; that is, with the acid(s) of the copolymers they form hydroxyalkyl ether esters.

The invention also pertains to improved surface coating compositions formed by homogeneously blending together in organic solvent(s) our hydroxyalkyl-containing copolymers and other reacitve resinous materials, and subsequently thermosetting an applied film of the solvent blend by subjecting same to a baking treatment. Typical reactive resinous materials which can be thermoset by reaction with our hydroxyalkyl-containing copolymers are (a) hydroxyl-containing resins such as urea/aldehyde, melamine/aldehyde, benzoquanamine/aldehyde and/or phenol/adelhyde condensation products and/or (b) liquid or low molecular weight epoxyhydroxypolyether resins such as the bisphenol/epichlorhydrin epoxy resins and/or the glycerol/epichlorhydrin epoxy resins of commerce. The epoxyhydroxypolyether resins have 1,2 epoxy groups capable of reaction with reactive groups of our hydroxyalkyl-containing copolymers. That is, the 1,2 epoxy groups are preferably esterfied (by reaction of 1 carboxyl group of our copolymers per epoxy group). In like manner, the amine/aldehyde and phenol/aldehyde condensation products are thermoset by etherification with —OH groups such as those of our polymers. Acidity in the copolymers (resulting from free carboxyl groups) is desired also to catalyze the identified etherification reactions. The epoxyhydroxypolyether resins described above can be supplemented and/or replaced with other monomeric and/or low-molecular weight polymeric compounds having 1,2 epoxy groups.

Accordingly, it is an object of this invention to provide novel acidic and/or neutral copolymers having residues therein of hydroxyalkyl esters of original ethylenically unsaturated acids (e.g. methacrylic, acrylic and/or itaconic acids), said esters having been secured by condensation of carboxyl groups with ethylene oxide and/or propylene oxide.

It is a further object to provide improved coating compositions of the organic-solvent-solution type utilizing the copolymers of the preceding object and/or equivalent copolymers having ·hydroxyalkyl groups ester-linked to a copolymer in conjunction with 1,2 epoxy-containing and/or other hydroxyl-containing resins or polymers.

These and other related objects will be understood from the foregoing and following description of our invention.

Hydroxypropyl acrylates, methacrylates and itaconates are known monomeric compounds. However, their use in forming copolymeric, hydroxy-functional intermediates for coating compositions has been found by us to lead to unexpected improvements in various properties of the coating compositions, particularly when the intermediates also contain free carboxyls. The following description of our invention will be found to disclose said unexpectedness.

THE COPOLYMERIC INTERMEDIATES

As noted briefly above, these are prepared from 2–3 carbon hydroxyalkyl esters of certain ethylenically unsaturated carboxylic acids in conjunction with the copolymerizable monomers such as styrene, alkyl acrylates, acrylonitrile etc. which contain ethylenic, preferably vinylic, unsaturation, or can be prepared in the other ways identified above.

In the foregoing and following description, the term "acrylate" is used, except where otherwise noted, in a generic sense identifying esters of $\alpha,\beta$ unsaturated monocarboxylic acids, e.g. acrylic acid, crotonic acid and/or alkyl substituted acrylic acids such as methacrylic acid. In such substituted acrylic acids, the alkyl groups can contain 1–4 carbon atoms.

Also in the foregoing and following description the terms "hydroxyalkyl," "hydroxyethyl" and "hydroxypropyl" esters are used, except where otherwise noted, in a generic sense to identify both the product resulting from esterifying one mol of alkylene oxide with one equivalent of carboxyl group (e.g. the monopropylene oxide esters) and also the products(s) resulting from thereafter etherifying the monoalkylene oxide ester(s) with additional mols (1–7) of alkylene oxide (e.g. hydroxypropyl ether esters).

The ester-linked hydroxyalkyl groups of our copolymeric intermediates, as formed in the ways set forth above, can give different results insofar as properties of finished coating compositions are concerned. Accordingly, for some coating purposes one method can be preferable to another. In all methods, as indicated, we accomplish the hydroxyalkylation by using alkylene oxides(s) rather than alkylene glycol(s), and in such use of alkylene oxide(s) any of the known techniques can be employed to accomplish our stated purposes. We prefer, however, to use benzyldimethylamine or ferric chloride as the catalyst, and where ferric chloride is employed we especially prefer to use the subsequent-iron removal technique described in our copending application Ser. No. 169,929, filed Jan. 30, 1962, now abandoned. Such technique involves the addition of oxalic acid and/or phosphoric acid to the esterified mass and then neutralization of the resulting mass with aqueous alkali metal alkali, e.g. sodium hydroxide or sodium carbonate. The ferric iron of the catalyst is thereby converted effectively to a form which is easily separated from the mass. The resulting monomer is thereby secured in an essentially iron-free condition with resultant excellent color.

For our desired polymeric intermediates, the hydroxyalkyl groups are ester-linked to copolymers prepared from copolymerizable monomeric compounds preferably those having a $CH_2=C<$ group, such as styrene, vinyl toluene, 1–8 carbon alkyl esters of one or more acrylic acids, acrylonitrile, etc. The following proportions apply to the finished copolymers:

| | Weight Percent Limits | |
|---|---|---|
| | Widest | Preferred |
| Hydroxyalkyl ester monomer residues | 5–50 | 5–20 |
| $CH_2=C<$ monomer(s) (other than alkyl acrylates) | 0–94 | 35–60 |
| 1–8 carbon alkyl acrylate(s) | 0–94 } 50–95 | 60–20 |
| Unesterified carboxylic acid residue(s) | 0–6 | 2–4 |

The copolymerization of the selected monomers is carried out in the solvent-type reflux treatments well understood in the art, using any of a variety of carbon-carbon polymerization catalysts, particularly peroxides. The solvent(s) used are non-reactive and include aromatics such as xylene, toluene, glycol ethers prepared from 2–8 carbon alkylene or oxyalkylene glycols and 1–4 carbon alkanols, 1–4 carbon aliphatic acid esters of said glycol ethers, ketones, alkanols, 1–4 carbon alkyl esters of lower aliphatic monocarboxylic acids, etc.

The catalyst induced polymerization reactions are highly exothermic. We have accordingly found it desirable to start by introducing a heel of solvent(s) or a heel of the uncatalyzed mixed monomers, and then heat the heel to reflux (in the case of a solvent heel) or to about 160°–325° F. The residue of mixed monomers is combined outside of the reaction vessel with the reaction catalyst(s) and then is added slowly to the heated heel in the vessel. The heating of the vessel can then be discontinued since the heat of reaction will thereafter maintain reaction conditions. The reaction vessel is desirably equipped with effective cooling means so that excessive temperatures can be avoided. Usually, however, one can find an appropriate rate of addition of the mixed and catalyzed monomers which (depending on the catalyst employed) will generate all the heat which is needed without requiring external cooling of the vessel. Shortly after all of the mixed and catalyzed monomers have been added to the vessel, the reactions will have been completed.

The initial choice of operating with a heel of solvent or with a heel of uncatalyzed monomers depends on whether or not one wants the finished reaction mass to be free of solvent. Where one wants to use the finished mass as a component of coating compositions then it is preferable to start with a heel of solvent(s), the latter being selected so that the finished reaction mass will have the desired solids content and will contain only solvents which are useful in the intended finished coating composition.

It will accordingly be understood that the polymerization of the catalyzed monomers can yield a product of 100% solids on one hand (by starting with a heel of uncatalyzed mixed monomers), or on the other hand can yield a solution having any desired solids content such as from about 40% to 100% preferably 50–90%.

The following examples illustrate the principles employed in preparing our desired hydroxyalkyl esters and/or our desired copolymeric intermediates, and include the best modes presently known to us for practicing those principles.

In said examples, the preparation of monomeric hydroxymonoalkyl esters is illustrated by Examples A-C, J and K, while Examples D-H and R illustrate conversion of such esters to our desired copolymeric intermediates having hydroxyalkyl and carboxylic functionality. Example L illustrates the hydroxypropylation of preformed hydroxymonoalkyl esters to convert the latter to hydroxyalkyl ether esters, while Example Q illustrates conversion of such ether esters to our desired polymeric intermediates. Examples M, N and P illustrate hydroxypropylation of preformed carboxyl-containing copolymers thereby to secure our desired intermediates. No examples I or O are included to avoid confusion with our numbered examples. The latter illustrate the use of our hydroxyalkyl ester intermediates in finished coating formulations.

*Example A*

$\beta$-hydroxypropyl methacrylate is prepared from the following materials:

| | G. |
|---|---|
| Methacrylic acid[1] | 3475 |
| Hydrated ferric chloride | 23.4 |
| Propylene oxide | 2348 |
| Hydroquinone | 3 |

[1] Contains .025 hydroquinone monomethyl ether.

Charge the methacrylic acid and ferric chloride, establish and maintain an inert nitrogen atmosphere, heat the charge to about 150° F. and start streaming in propylene oxide so as to add all of it within about a two hour period. Maintain heat at reflux (about 140–150° F.) throughout the addition, cooling the mass when necessary. After all the propylene oxide has been added, discontinue heating and allow exothermicity to carry the temperature to about 200° F. Add the hydroquinone at 200° F., and then continue to maintain the heat at about 200° F. for an additional two hours or until the propylene oxide has been substantially consumed, as determined by acid value which should be about 30–40 (mg. KOH per gram of sample).

At this point the mass is cooled to about 120° F. and is treated to remove the ferric chloride catalyst by either of the following exemplary procedures.

TREATMENT 1 (PHOSPHORIC ACID)

Add 29.8 g. of 85% phosphoric acid, with stirring. Then add an aqueous solution composed of 24.5 g. sodium hydroxide and 195 g. water. Stir.

Then add 997 g. xylol, stir.

Then filter the product and reduce with 2990 g. n-butanol.

The finished monomer solution has a product content of 58% and is composed of the following materials:

| | Percent by wt. |
|---|---|
| β-hydroxypropyl methacrylate | 55.2 |
| Methacrylic acid | 2.9 |
| Water | 2.0 |
| Xylol | 10 |
| N-butanol | 29.9 |

TREATMENT 2 (OXALIC ACID)

Add 497 g. of an aqueous solution composed of about 50 g. oxalic acid and 447 g. water. Stir well.

Add 52.5 g. of an aqueous solution composed of 10.5 g. sodium hydroxide and 42.0 g. water. Stir well.

Then add 3900 g. xylol, 585 g. water, 117 g. sodium chloride. (The sodium chloride is added to assist phase separation and to reduce mutual phase solubility.) Stir well and allow the aqueous phase to settle. Drain off the aqueous layer and filter the non-aqueous product. The product content of the resulting solution is about 60% (57% β-hydroxylpropyl methacrylate, 3% methacrylic acid) and contains about 4% water, balance xylol.

The hydroxypropyl esters (and solutions) recovered from either method of purification have excellent water-white color and the esters contain about 12.1% (wt.) of hydroxyls; (theory=11.2%). They exhibit good storage stability.

*Example B*

β hydroxypropyl acrylate is prepared from the following materials:

| | G. |
|---|---|
| (A) Acrylic acid [1] | 2790 |
| (B) Hydrated ferric chloride | 22.4 |
| (C) Propylene oxide | 2246 |
| (D) Hydroquinone | 2.6 |
| (E) Phosphoric acid | 28.7 |
| (F) Sodium hydroxide } solution { | 23.2 |
| (G) Water | 92.8 |
| (H) Xylol | 839 |
| (I) n-Butyl alcohol | 2517 |

[1] Contains 0.1% hydroquinone monomethyl ether.

Materials A, B, C and D are treated in the manner described in Example A. Then materials E–H inclusive are added as in Treatment 1 above, followed by filtration of the product. The filtered product is reduced with I.

The resulting hydroxypropyl acrylate has a hydroxyl content of about 13.4% by weight; (theory=12.6%).

*Example C*

Di (β-hydroxypropyl) itaconate is prepared from the following materials:

| | G. |
|---|---|
| Itaconic acid | 765 |
| Tetrahydrofuran[1] (as solvent) | 965 |
| Hydrated ferric chloride | 6.8 |
| Propylene oxide | 682 |
| Phosphoric acid (85%) | 8.7 |
| Methanol solution of NaOH (at 10% NaOH by wt.) | 70.0 |
| n-Butyl alcohol to 50% solids (wt.). | |

[1] Contains 0.1% hydroquinone.

The ferric chloride is dissolved in the tetrahydrofuran and charged to a flask. The itaconic acid is added and a nitrogen atmosphere is established and thereafter maintained. The charge is heated to about 130° F. at which point addition of propylene oxide is begun, with heat off, at a rate designed to add all of it within about 2 hours. As the oxide is added the temperature rises to 145–160° F. After all of the oxide is in, heating is resumed and a temperature of 165–175° F. is maintained for about three hours. At this point about 100% conversion of the propylene oxide has been attained (acid value about 28), and the heat is cut off. Add the phosphoric acid, then the methanol/NaOH solution, stir, and then distill off most or all of the tetrahydrofuran by attaining a final flask temperature of about 300° F. Allow the mass to settle, reduce same with the n-butyl alcohol and filter.

It should be noted that in Examples A–C and E, the n-butyl alcohol used to reduce the hydroxypropyl esters also has the function of suppressing transesterification to the diesters, whose presence leads to high viscosities and/or gelled products. Isopropyl alcohol can be used similarly.

*Example D*

A copolymer is prepared from the hydroxypropyl methacrylate of Example A, Treatment 1 or 2 by using the following materials and proportions:

| | Pounds | Solids, percent |
|---|---|---|
| A. Hydroxypropyl methacrylate solution (Ex. A) | 227.5 | 21.5–22.0 |
| Methacrylic acid | 10.7 | [1] 2.98 |
| 2-ethylhexyl acrylate | 205.5 | 35.2–35.0 |
| Styrene | 235.0 | 40.3–40.0 |
| Benzoyl peroxide | 6.0 | |
| Tert. butyl perbenzoate | 6.0 | |
| B. n-Butyl alcohol | 132.5 | |
| Xylol | 177.5 | |

[1] Total.

B is charged to a kettle equipped with a condenser and heated to about 238° F. A mixture A is then streamed in at a rate calculated to add all in about 2 hours. Refluxing occurs while A is being added, and is thereafter maintained (temperature held at about 235–240° F.). After all of mixture A has been added, the viscosity is about S (Gardner-Holdt at 77° F.). Refluxing is continued for about another 3.5 hours during which time the viscosity is raised to Z–$Z_1$. The heat is then cut off and the batch allowed to cool. The resulting copolymer has a solids content of about 60%, an acid value of about 20 (calculated on solids), a Gardner color less than 1, and an hydroxyl content of about 2.5% (wt.).

The hydroxypropyl acrylate of Example B can be substituted in the above example for the methacrylate, to secure a fully comparable copolymer.

Example E

A copolymeric intermediate using the di(hydroxypropyl) itaconate of Example C is prepared from the following kinds and amounts of materials:

|  | Pounds | Solids, percent |
| --- | --- | --- |
| A. Di (hydroxypropyl) itaconate solution (Ex. C) | 300 | 16.66 |
| 2-ethylhexyl acrylate | 300 | 33.33 |
| Styrene | 400 | 44.44 |
| Methacrylic acid | 50 | 5.55 |
| Benzoyl peroxide | 10 |  |
| Tert. butyl perbenzoate | 10 |  |
| B. n-Butyl alcohol | 190 |  |
| Xylol | 340 |  |

Mixture B is charged to a kettle equipped with a condenser and is heated therein to about 200° F. Mixture A is then streamed in with heat off, at a rate calculated to add all in about 1.25 hours. At the end of this time exothermicity has raised the temperature to about 250° F., and refluxing has continued for some time. The temperature is thereafter maintained at about 245° F. for about 3.5 hours at the end of which time the viscosity (Gardner-Holdt) of the mass is about X. Six additional grams of benzoyl peroxide is added at this time and heating is continued at 240–245° F. for about 2.25 hours, thereby attaining a solids content of about 58% and a viscosity of X–Y. The batch is thereupon allowed to cool. Its acid number is about 34 (calculated on solids) and has a Gardner color of 1–2.

Example F

The hydroxypropyl methacrylate of Example A (Treatment 1 or 2) is here converted to a polymeric intermediate by employing the following kinds and amounts of materials:

|  | Pounds | Solids, percent |
| --- | --- | --- |
| A. Hydroxypropyl methacrylate solution (Ex. A) | 333 | 19.0 |
| Methacrylic acid | 46 | [1] 5.6 |
| Styrene | 300 | 30.0 |
| Ethyl acrylate | 454 | 45.4 |
| Benzoyl peroxide | 10 |  |
| Tert. butyl perbenzoate | 10 |  |
| B. n-Butyl alcohol | 207 |  |
| Xylol | 340 |  |

[1] Total.

Mixture B is charged and heated to 210° F. Mixture A is added at a rate calculated to add all in about one hour. During addition and subsequently, the heating is controlled to maintain the charged mass at about 240° F. About one hour after all of mixture A has been added, the Gardner-Holdt viscosity is about X–Y and refluxing is occurring. After about another 1.25 hours the viscosity is only $Z_1$–$Z_2$ so 5 g. benzoyl peroxide is added and heating is continued for another half hour. The batch is then cooled. Final Gardner-Holdt viscosity at 77° F. is $Z_3$–$Z_4$, the solids content is about 60%, the acid value is about 50 and the Gardner color is less than 1.

Example G

The hydroxypropyl methacrylate ester product of Example A (Treatment 2) is here copolymerized with various kinds and amounts of copolymerizable monomers to produce desired copolymer intermediates of the invention. The following table indicates the various formulations, in parts by weight.

| Material | Run and Solids | | | | |
| --- | --- | --- | --- | --- | --- |
|  | 1 | 2 | 3 | 4 | 5 |
| Ex. A monomer, (Treatment 2) contained in 387 g. solution | 232 | 232 | 232 | 232 | 232 |
| Methacrylic acid (Glacial) | 18 | 18 | 18 | 18 | 18 |
| Styrene | 250 | 300 | 250 | 350 | 370 |
| 2-Ethyl hexyl acrylate |  | 300 |  |  | 350 |
| Butyl Acrylate | 350 |  |  | 200 |  |
| Methyl methacrylate | 150 | 150 | 150 |  |  |
| Ethyl acrylate |  |  | 350 | 200 |  |
| N,N-diethylamine-ethyl acrylate |  |  |  |  | 30 |
| Total solids | 1,000 | 1,000 | 1,000 | 1,000 | 1,000 |
| Benzoyl peroxide | 10 | 10 | 10 | 10 | 10 |
| Tert. butyl perbenzoate | 10 | 10 | 10 | 10 | 10 |
| N-butyl alcohol | 340 | 340 | 340 | 340 | 340 |
| Xylol | 200 | 200 | 200 | 200 | 200 |
| Final solids content, percent | 60.8 | 60 | 59.5 | 60 | 58.4 |
| Gardner Holdt Viscosity | $Z_3$ | $Z_1$–$Z_2$ | $Z_4$ | $Z$–$Z_1$ | $Z_5$ |
| Calculated acid value [1] | 20 | 20 | 20 | 20 | 20 |
| Gardner color | [2]WW | WW | WW | 1 | 7–8 |

[1] On solids.
[2] Water White.

The "runs" tabulated above were carried out in full accord with the procedure described in Example D by merely substituting the here indicated kinds and amounts of materials.

Example H

Polymeric intermediates illustrating variations in monomer contents are summarized by the following tabulations, where weights of materials employed are expressed in grams. The intermediates are prepared in full accord with the procedure of Example D using the same catalysts and solvents in proportionate amounts.

| Monomer | 1 | 2 | 3 | 4 | 5 | 6 | 7 | 8 | 9 | 10 |
|---|---|---|---|---|---|---|---|---|---|---|
| Styrene | 19 | 38.5 | 58 | | | | | | | |
| Vinyl Toluene | | | | | | | 45.2 | 41.8 | 38.5 | 38.5 |
| 2-Et. Hex. Acrylate | 58 | 38.5 | 19 | 19 | 38.5 | 58 | 45.2 | 41.8 | 38.5 | 38.5 |
| Ex. A (monomer)* | 22 | 23 | 23 | 58 | 38.5 | 19 | 9.6 | 16.4 | 23 | 23 |
| Methacrylic acid | 1.8 | 1.8 | 1.8 | 23 | 23 | 23 | 1.8 | 1.8 | 2.8 | 0.9 |
| Cooking time, hours | 7 | 7 | 11 | 1.8 | 1.8 | 1.8 | 7 | 7 | 7 | 6 |
| G-H viscosity | U-V | X-Y | $Z_3$ | 7 | 6 | 7 | V | X | -Y | X-Y |
| Solids Content, percent | 61 | 60.5 | 61.4 | U | X-Y | $Z_2$-$Z_3$ | 59.5 | 59.5 | 59.6 | 59.2 |
| | | | | 59.0 | 59.8 | 59.3 | | | | |

*Charged as the solution prepared in Example A, Treatment 1.

The Gardner color of all finished solutions of intermediates is less than 1.

Example J

This example illustrates the preparation of hydroxypropyl methacrylate by using benzyldimethylamine as hydroxyalkylation catalyst.

| | G. |
|---|---|
| Methacrylic acid | 594 |
| Hydroquinone | 0.37 |
| p-Benzoquinone | 0.094 |
| Benzyldimethylamine | 4 |
| Propylene oxide | 401 |

The propylene oxide is added slowly to the other ingredients at 200° F. so that a temperature of 200° F. is maintained without too vigorous a reflux. The addition requires about 5 hours. The temperature is maintained at 200° F. until an acid value of 30–40 is reached, requiring an additional 5–6 hours. The product has a Gardner color of 2–4 and an hydroxyl content of 11.8%.

The purpose of the p-benzoquinone is to eliminate vapour phase polymerization of the methacrylic acid.

Example K

Preparation of hydroxyethyl methacrylate with benzyldimethylamine.

| | G. |
|---|---|
| Methacrylic acid | 1290 |
| Hydroquinone | 0.8 |
| p-Benzoquinone | 0.2 |
| Benzyldimethylamine | 6.6 |
| Ethylene oxide | 660 |

The first 4 ingredients are mixed and heated to 200° F. A slow trickle of air and ethylene oxide gas are passed in through separate tubes. The rate of ethylene oxide gassing is maintained at such a rate that very little reflux and no loss through the condenser takes place at 200° F. Gassing is continued till acid value drops to 30–40. A total time of 15 hours is required. The air is necessary in this example to prevent vapour phase polymerization.

The product has a Gardner color of 8 and is free from polymer. It has an hydroxyl content of 13.5%.

Example L

This example illustrates the preparation of the hydroxypropyl ether ester by etherification of hydroxypropyl ester with propylene oxide. The latter ester is here secured by the procedure described in Example A (freed of iron by Treatment 2) or by the procedure of Examples J and K.

The ether ester is prepared from the following materials:

| | G. |
|---|---|
| (A) Example A, Treatment 2[1] | 3120 |
| (B) BF$_3$-ether complex } solution | { 28.8 |
| Xylol | 300 |
| (C) Propylene oxide | 2895 |
| (D) Xylol | 1650 |

[1] Charged as a water-free solution in xylol, 60% solids content. This product was prepared by heating the solution secured by the process of Example A (Treatment 2) to 170° F. under vacuum (thereby to remove water) and replacing the water so removed with xylol.

Charge A and D to a flask. Establish and maintain thereafter a nitrogen atmosphere. Heat to 50° F. and begin simultaneous separate additions of B and C in a ratio of about 1:10. Maintain temperature, by heating and/or cooling, at 80–100° F. After about 6.5 hours all B and C have been added. Cool the mass, add 121.5 g. of a 20% solution of sodium hydroxide in methanol, then add 1000 g. water, followed by 100 g. sodium chloride. Separate the aqueous phase, filter, and add .02% (wt.) of hydroquinone (as inhibitor), calculated on finished product in the solution.

The finished solution from which the BF$_3$ catalyst has been largely removed, has an acid value (in the product) of about 10, has a solids (product) content of about 60% by wt., contains about 3% water and has a hydroxyl content of 5.18% by wt. It will be noted that in this example four mols of propylene oxide are added per mol of hydroxypropyl methacrylate. The conditions described in the example are appropriate, by varying the weight of propylene oxide, to add from 1 to 8 mols, preferably 2–6 mols.

In the last step of the example, the solution need not be cooled before adding the 20% methanol solution of sodium hydroxide, and after the latter has been added the whole mass can be heated to 150° F. followed by the specified addition of water, salt, etc. In either this or the procedure of the example, the reaction involved is a neutralization of BF$_3$ with about a stoichiometric quantity of NaOH:

$$BF_3 + 3NaOH \rightarrow 3NaF + B(OH)_3$$

The addition of water dissolves the NaF, and the salt assists phase separation and filtration.

When the product solution of Example J is used as replacement for the solution of Example A in the above example, the BF$_3$-ether complex should be increased about 20% by wt. to overcome the amine present in the Example J solution. This applies equally well when ethylene oxide is used instead of propylene oxide.

Example M

This example illustrates the preparation of an acidic copolymer which is subsequently hydroxypropylated to form a desired hydroxypropyl ester combined in copolymeric form.

The starting copolymer is prepared from the following materials in the manner described in Example D.

| | Grams | Resin Solids, percent by wt. |
|---|---|---|
| (1) Glacial methacrylic acid | 7.02 | 15.5 |
| (2) 2-ethyl hexyl acrylate | 9.79 | 21.6 |
| (3) Vinyl toluene | 28.38 | 62.9 |
| (4) Benzoyl peroxide | 0.45 | |
| (5) Tert. butyl perbenzoate | 0.45 | |
| (6) n-Butyl alcohol | 10.00 | |
| (7) Amsco Solvent No. 140L* | 40.00 | |
| (8) Benzyldimethylamine | 0.186 | |
| (9) Propylene oxide | 3.75 | |

*A mineral spirits solvent at Kauri Butanol Value 37–38; initial boiling point 360–366° F.; ASTM end point 403–410° F.

The acidic copolymer, as prepared from the first seven materials, has a solids content of 48% (wt.) an acid number of 99 (on solids), a viscosity of Y-Z (Gardner-Holdt) and a Gardner color of 1. While the solution is still in the flask, the benzyldimethylamine is added (above quantity represents 5% by wt. calculated on propylene oxide to be added) and the solution is heated to 260°–270° F.

under a nitrogen atmosphere. The propylene oxide is then added incrementally at a rate which affords easy maintenance of the indicated temperature. After about 11 hours the propylene oxide has all been added, and the acid number of the mass has been reduced to about 22 (on solids). The resulting solution is then cooled and is found to have a Gardner-Holdt viscosity of Y–Z, a Gardner color of 1 and a solids content of about 50%. The benzyldimethylamine can be replaced with 5% of α-methylbenzyl dimethylamine, in which case a reaction time of about 20 hours brings the acid value down to about 8. Slower catalysts are triethylamine (3% requires a reaction time of 42 hours to secure an acid number of 24) and the tertiary amine catalyst made by reacting one mol diethylaminopropylamine with two mols butyl glycidyl ether (3% of the latter catalyst requires a reaction time of 42 hours to reach an acid value of 35).

*Example N.—Ethylene oxide addition to carboxyl-bearing acrylic polymers*

|  | Grams | Resin Solids, percent by wt. |
|---|---|---|
| (1) Methacrylic acid | 161 | 17.6 |
| (2) 2-Ethyl hexyl acrylate | 350 | 38.4 |
| (3) Styrene | 400 | 44.0 |
| (4) Benzoyl peroxide | 9 |  |
| (5) Tertiary butyl perbenzoate | 9 |  |
| (6) n-Butyl alcohol | 309 |  |
| (7) Xylene | 309 |  |
| (8) n-Butyl alcohol | 34.0 |  |
| (9) Xylene | 34.0 |  |
| (10) Benzyldimethylamine | 3.4 |  |
| (11) Ethylene oxide | 1 67.5 |  |

[1] Theoretical for AV 20.

Ingredients 1–7 are processed as in Example D to a final viscosity of $Z_4$–$Z_5$. Ingredients 8, 9 and 10 are added. Ingredient 11 is passed in as a gas below liquid surface at a temperature of 230–240° F. until an acid value of 20 is reached (a total time of 8 hours for the oxide addition is required).

FINAL PROPERTIES

| | Percent by wt. |
|---|---|
| Non-volatile content | 60 |
| Viscosity (Gardner-Holdt) | $Z_2$–$Z_3$ |
| Acid value (on solids) | 21 |
| Color (Gardner) | 1 |

*Example P.—Hydroxyethylated methacrylic acid copolymer*

| | G. |
|---|---|
| (1) Styrene | 60.0 |
| (2) Butyl acrylate | 25.0 |
| (3) Methacrylic acid | 10.0 |
| (4) Benzoyl peroxide | 1.0 |
| (5) Tertiary butyl perbenzoate | 1.0 |
| (6) n-Butyl alcohol | 50.0 |
| (7) Xylene | 50.0 |
| (8) Benzyldimethylamine | 0.25 |
| (9) Ethylene oxide | 5.0 |

The first seven materials are converted to a copolymer solution in the manner described in Example D and then the solution is treated as in Example N.

Viscosity of initial polymer solution is R (Gardner-Holdt).

FINAL PROPERTIES

| | Percent by wt. |
|---|---|
| Non-volatile content | 49.5 |
| Viscosity (Gardner-Holdt) | U |
| Acid value (on solids) | 14.5 |
| Color (Gardner) | 3 |

*Example Q*

This example illustrates the conversion of the monomeric hydroxypropyl ether ester of Example L, and of comparable ether esters, to finished copolymers appropriate for use in making our improved coating compositions. In the following table, monomers containing 2, 4 and 6 mols of added propylene oxide are referred to as starting materials. The hydroxypropyl ether monomer containing 4 mols of added propylene oxide (Run 2) is the monomer whose preparation is described in Example L. The monomers containing 2 and 6 mols of added propylene oxide (added to hydroxypropyl ester) were prepared in accordance with Example L except for adjustment of the amount of propylene oxide added to the hydroxyalkyl methacrylates of Examples A, J and K, and except for indicated adjustment of amount of $BF_3$ catalyst.

| Materials | Run Number | | |
|---|---|---|---|
| | 1 | 2 | 3 |
| Propylene oxide (mols) | 2 | 4 | 6 |
| Amount $BF_3$ catalyst, percent | 1 | 1 | 1 |
| $BF_3$ removed | Yes | Yes | Yes |
| Acid value of product | 13.5 | 10 | 8 |
| Percent hydroxyl (calc.) | 6.5 | 4.5 | 3.45 |

| | Composition of Monomer Solution (Wt. Percent) | | |
|---|---|---|---|
| Polyether monomer | 58.3 | 58.3 | 58.3 |
| Xylol | 38.8 | 38.8 | 38.8 |
| Water | 2.9 | 2.9 | 2.9 |

| | Conversion to Polymers (Method of Ex. D) | | |
|---|---|---|---|
| Solution, Run No. 1, g | 430 | | |
| Solution, Run No. 2, g | | 500 | |
| Solution, Run No. 3, g | | | 688 |
| Glacial Methacrylic acid, g | 25 | 25 | 24 |
| Styrene, g | 500 | 675 | 576 |
| Butyl acrylate, g | 225 | | |
| Benzoyl peroxide, g | 10 | 10 | 10 |
| t-Butyl perbenzoate, g | 10 | 10 | 10 |
| Xylol, g | 853 | 820 | 753 |
| Non-volatile content (Wt. percent) | 49 | 50 | 49 |
| Color | *WW | *WW | *WW |
| Viscosity (Gardner-Holdt) | P | T–V | N–O |
| Acid Value (on non-vol.) | 18–22 | 18–22 | 18–22 |
| Hydroxyl content (calc.; wt. percent) | 1.62 | 1.35 | 1.38 |

*Water White.

*Example R*

A polymeric hydroxyalkyl-containing product is here prepared from the following materials:

| | G. |
|---|---|
| Monomeric itaconic diester of Example C | 23.50 |
| 2-ethylhexyl acrylate [1] | 23.50 |
| Styrene | 23.50 |
| Xylol | 20.00 |
| n-Butyl alcohol | 8.30 |
| Benzoyl peroxide | 0.60 |
| t-Butyl perbenzoate | 0.60 |

[1] Contains about 0.01% methyl ether of hydroquinone.

The above materials are polymerized together in the manner described in Example D to form a solution having a non-volatile content of 60% (wt.), a Gardner-Holdt viscosity of W–X, an acid number (on non-volatiles) of 6–7, and a Gardner color slightly under 1.

*Example S*

This example illustrates the reaction of hydroxyalkyl ester with butylated melamine/formaldehyde resin folvolatile content is about 55.6% by wt., and in which the pigment/binder ratio is about 0.8 to 1.

The hydroxyalkyl ester copolymers of Examples D–H and L–R can be used (in the form of their indicated solutions) in said typical formula to secure enamels which produce baked films having excellent protective and durability qualities for metals. The applied films can be thermoset by baking them for 5–40 minutes at 250°–400° F., the longer times applying to the lower temperatures.

*Example 4*

One of the outstanding merits of our coating compositions is the excellent gloss retention on weathering. The following Table I illustrates this quality in comparison with the selected conventional metal coatings. Table II illustrates the physical properties of the same and other coatings of the invention. In securing the data of the tables the coating compositions were applied by spraying to phosphate-treated iron panels of 20 gauge thickness, to an average film thickness of 1.4 mils. The wet panels were baked for 20 minutes at 320° F., after which the panels used for physical testing were aged for 24 hours before being subjected to the tests. For the weathering tests, panels were exposed in Florida for six months.

TABLE I

| Coating | 20° Gloss | |
|---|---|---|
| | Initial | 6 months Florida |
| AA [1] | 74.2 | 71.8 |
| BB [2] | 77.0 | 73.0 |
| Epoxy/acrylic [3] | 88.5 | 0 |
| Alkyd/amino [4] | 70.0 | 60.4 |

[1] The coating secured by using the copolymer solution of Example D in the typical formula of Example 3.
[2] The coating secured by using the copolymer solution of Example H, run 10 in the typical formula of Example 3.
[3] A pigmented coating prepared from the coconut oil ester of bisphenol/epichlorhydrin resin and an acidic acrylic acid/acrylic ester/styrene copolymer; described and claimed in copending U.S. application No. 2596 filed January 15, 1960, now U.S. Patent No. 3,107,226.
[4] A conventional pigmented coating prepared from oil-modified alkyd resin and butylated melamine/formaldehyde resin.

*Example 5*

The following table (Table III) illustrates the chemical resistance of our coatings as measured by immersion in typical film-softening baths.

TABLE III

| Coating | Pencil Hardness | | | |
|---|---|---|---|---|
| | 1:1 Mix Lard Oil/ Oleic Acid [1] | | Ethylene Glycol Monoethyl Ether Acetate [2] | |
| | Before | After | Before | After |
| Ex.H, Run 8* | 4H | 2H | 4H | HB |
| Ex.H, Run 5* | 2H | HB | 2H | 2B |
| Ex.Q, Run 2* | 5H | 4H | | |
| A (above)* | 2H | H | 2H | B |
| C (above)* | 5H | H | | |
| Alkyd/Amino (above) | H | F | H | Very soft |

[1] Seven days immersion at 77° F.
[2] Three hours immersion at 77° F.; one hour recovery.
*Used in typical formula Example 3.

In addition, our coatings exhibit good detergent resistance and in this quality significantly surpass the detergent resistance of the convention alkyd/amino (above). Moreover, our coatings exhibit excellent can stability as measured by increase in viscosity after 1,000 hours at 140° F. particularly when the coatings include n-butyl alcohol in the solvent sytsem. We believe that this alcohol suppresses reaction between the hydroxyls of the hydroxyalkyl-containing copolymers of the invention and the hydroxyls of the amine/aldehyde resins. Our coatings accordingly are well adapted to withstand the prolonged storage involved in the commercial distribution of coating compositions in all climates. The products made by hydroxyalkylation with propylene oxide are better in this respect than comparable products hydroxyalkylated with ethylene oxide.

As will be apparent from the foregoing examples, our coatings can be thermoset in shorter baking schedules and at lower temperatures than conventional epoxy/acrylic and/or alkyd/amino coatings, which require 30 minutes at 300° F. or 15 minutes at 325° F.

TABLE II

| Coating | Pencil Hardness | Flexibility [1] | Physical Properties | | |
|---|---|---|---|---|---|
| | | | Heat Color Rentention [2] | Impact Resistance [3] | |
| | | | | Direct | Indirect |
| AA (above) | 4H | 1 | 4.2 | 26 | 6 |
| Ex. G, Run 4* | 5H | 1.25 | 0.2 | 25 | 6 |
| Ex. G, Run 2* | 4H | 4 | 1.0 | 26 | 6 |
| Ex. H, Run 8* | 2H | 0.25 | 4.3 | 28 | 6 |
| Ex. H, Run 5* | 4H | 1.25 | 2.7 | 28 | 6 |
| Ex. Q, Run 2* | 5H | 0 | 9.2 | 28 | 10 |
| CC [4] | 5H | 0 | 10.0 | 28 | 16 |
| DD [5] | 5H | 0.5 | | | 10 |
| Alkyd Amine (Table I) | H | 0 | 25.0 | 28 | 10 |

[1] Measured on standard half-inch conical mandrel. The figures indicate inches of failure from the small end of the bend.
[2] Measured by the difference in color, $Y_2-Y_1$ where $Y_2$ is the degree of yellowing after baking 16 hours at 350° F. and $Y_1$ is the degree of yellowing after a normal bake. Degree of yellowing is determined by the formula $$Y = \frac{A-B}{G} \times 100$$

where A=percent of reflectance using an amber filter, where B=percent of reflectance using a blue filter, and where G=percent of reflectance using a green filter.
[3] Measured in inch pounds of force producing failure.
[4] Prepared by using in the typical formula of Example 3 a copolymer solution prepared as follows: The hydroxypropylated monomer of Example A, Treatment 2, was converted to a hydroxypropylated ether ester in the manner described in Example L, after which 500 g. of the resulting solution was mixed with 574 g. styrene, 26 g. methacrylic acid (glacial), 100 g. butyl acrylate, 10 g. benzoyl peroxide, 10 g. t. butyl perbenzoate and 800 g. xylol, and the mass was copolymerized in the manner described in Example D to a copolymer solution having a non-volatile content of 50.5% (wt.), a Gardner-Holdt viscosity of Q–R, a water white color, and an acid value (on non-volatiles) of about 20.
[5] Prepared by using in the typical formula of Example 3 a copolymer solution prepared as follows: A portion (500 g.) of the hydroxypropylated ether ester used in preparing coating CC was mixed with 575 g. styrene, 25 g. methacrylic acid, 100 g. acrylonitrile, 10 g. benzoyl peroxide, 10 g. t. butyl perbenzoate, 500 g. n-butyl alcohol and 300 g. xylol, and the mass was copolymerized in the manner described in Example D to a copolymer solution having a non-volatile content of 50% (wt.), a Gardner-Holdt viscosity of Y–Z, a Gardner color of 3, and an acid value (on non-volatiles) of about 20.
*Coatings were prepared by using the solution of the indicated example in the typical formula of Example 3.

lowed by copolymerization of the resulting products with monomers having a $CH_2=C<$ group.

The following materials were used:

A
| | G. |
|---|---|
| Melamine | 113.3 |
| 40% butyl alcohol solution of formaldehyde | 363.3 |
| n-Butyl alcohol | 139.9 |
| Hexamethylenetetramine | 4.0 |
| Hydroxypropyl methacrylate (Example A) | [1] 192.1 |

B
| | G. |
|---|---|
| Xylol | 80.3 |

C
| | G. |
|---|---|
| Styrene | 500 |
| 2-ethylhexyl acrylate | 500 |
| Methacrylic acid | 80.3 |
| n-Butyl alcohol | 162.0 |
| Benzoyl peroxide | 20.0 |

D
| | G. |
|---|---|
| n-Butyl alcohol | 448 |
| Solvesso No. 100 [2] | 323.3 |
| Xylol | 162 |

E
| | G. |
|---|---|
| Benzoyl peroxide | 5 |
| Tert. butyl perbenzoate | 5 |

[1] Solution.
[2] A hydrocarbon liquid containing over 96% by wt. of methylated aromatics, boiling between 160 and 175° C. and having a kauri-butanol value of about 93.3.

Charge A to a flask fitted with condenser and water trap and heat to 225° F. Reflux for about 0.5 hours at 215–225° F. and add B; then begin water removal with return of solvent, and continue the treatment for about 3 hours, attaining a temperature of about 230° F. when about 85% of the theoretical water has been removed and attaining a final temperature of about 248° F. Cool the batch to room temperature. Add C to the flask to help rinse it out. Discharge to another vessel and hold for the next step.

Add D to the empty flask and heat to reflux (about 235° F.). Begin addition of the retained mass (held above) at a rate calculated to add all in about 1.5 hours, and heat to hold the temperature at about 250° F. After all the retained mass has been added, heat for an additional 2.5 hours and add E. Continue heating for another 1.5 hours or until water begins to come off. Remove water for the next 1.5 hours, and if necessary to gain a Gardner-Holdt final viscosity of about S–T, add 2.5 g. tert. butyl perbenzoate. When said viscosity has been attained, cool and discharge.

The finished solution has a solids content of about 53%, an acid number of 48, and a Gardner color of about 2.

*Example T*

This illustrates the preparation of a low acid value copolymer product including hydroxypropyl methacrylate. The copolymer is prepared in the manner of Example D from the following materials:

| | G. |
|---|---|
| Example A, Treatment 2, solution | 19.60 |
| 2-ethylhexyl acrylate | 11.75 |
| Vinyl toluene | 23.55 |
| VM & P naphtha | 32.20 |
| Benzoyl peroxide | 0.60 |
| t-Butyl perbenzoate | 0.60 |

The resulting solution of copolymer has a product content of 60% by wt., a Gardner-Holdt viscosity of Z, an acid number (on non-volatiles) of 6–7, and a Gardner color of 1. The resin is easily soluble in mineral spirits and exhibits good flexibility in combination with a mineral-spirits-soluble alkylated melamine/formaldehyde (4:1 solids ratio).

*Example 1*

Here a coating composition is prepared from the intermediate of Example F. The composition is formulated as follows:

| | G. |
|---|---|
| Intermediate of Example F (in solution form) | 100 |
| Epoxy resin [1] (as 50% solution in xylol) | 60 |
| Isobutylated melamine/formaldehyde resin (as 50% solution in isobutyl alcohol) | 20 |
| Ethyleneglycol monoethyl ether | 40 |
| Xylol | 100 |

[1] Epon 1001; a bisphenol/epichlorhydrin condensation product; hydroxy equivalent of 130; epoxy equivalent of 450–525, melting point 64–76° C. Can be replaced in whole or in part with any other equivalent bisphenol and/or glycerol/epichlorhydrin resin of equal or lower molecular weight.

The coating composition is prepared by merely blending the above materials together.

The resulting composition can be applied in any desired manner to a metallic or other heat-resistant substrate and cured to a thermoset condition by baking for 20 minutes at 300° F. or 15 minutes at 350° F. The solution can be pigmented as desired, and when pigmented to form an enamel the composition can be used as a one-coat appliance enamel. When pigmented with anti-corrosive and/or hiding pigments the composition is very satisfactory for use as an appliance primer. The baked films have high pencil hardness (6–7H), satisfactory flexibility, high toughness and excellent durability. As indicated an outstanding merit of the compositions is their ability to be heat-cured at relatively low temperatures in relatively short periods of time.

*Example 2*

A white thermosetting primer is prepared from the following materials:

| | G. |
|---|---|
| Titanium dioxide | 100 |
| Copolymer solution of Example D | 392 |
| Isobutylated melamine/formaldehyde resin solution of Example 1 | 140 |
| Alkylated phenol/formaldehyde resin (100% solids) | 125 |
| Ethyleneglycol monoethyl ether acetate | 53 |
| Solvent naphtha (coal tar) | 96 |
| Ethyleneglycol monoethyl ether | 125 |

The foregoing ingredients are ground together to a fineness of 6 on the Hegeman gauge. The finished coating composition has a viscosity of 75 seconds (No. 4 Ford Cup), a non-volatile content of 51% and a weight per gallon of 8.7 lbs. It can be applied by brushing or in other conventional ways; for spray application it should be reduced 3/1 with solvent naphtha. An applied film on a metal substrate is cured (thermoset) by baking 10–20 minutes at 400° F. The baked film can be top-coated with any desired baking-type enamel, thereby to secure a coating system affording excellent protection to the substrate.

*Example 3*

A typical enamel formulation of the invention is as follows:

| | Lbs. |
|---|---|
| Titanium dioxide | 285 |
| Hydroxyalkyl-containing resin solution (at 60% non-volatiles | 480 |
| Isobutylated melamine/formaldehyde resin solution of Example 1 | 140 |
| Ethyleneglycol monoethyl ether acetate | 78 |
| Xylol | 183 |
| Silicone solution [1] | 2.2 |

[1] 10% solution of a dimethyl polysiloxane oil in xylol.

The formulation yields a pigmented coating composition in which the pigment volume concentration is 20.8%, in which the ratio of hydroxyalkyl ester resin solids to melamine/aldehyde resin solids is 80:20, in which the non-

Example 6

This example illustrates the use of urea/aldehyde and/or melamine/aldehyde resins in combination with our hydroxyalkylated copolymer products in providing useful metal-coating compositions.

The hydroxyalkylated copolymer here employed is prepared from the monomer of Example A and from other copolymerizable materials according to the following formulation:

|  | G. |
|---|---|
| Example A monomer | 19.60 |
| 2-ethyl hexyl acrylate | 11.75 |
| Vinyl toluene | 34.10 |
| Methacrylic acid | 1.17 |
| VM & P naphtha | 32.20 |
| Benzoyl peroxide | 0.60 |
| t. Butyl perbenzoate | 0.60 |

These materials are copolymerized in the manner described in Example D to secure a copolymer solution having a non-volatile content of 60% (wt.), a Gardner-Holdt viscosity of $Z_3$, an acid value (on non-volatiles) of about 20, a Gardner color of 1, and a hydroxyl content of 2.0% (wt.).

Four blended coating compositions are then prepared from the above solution by admixing same with various amine/aldehyde resins. One of said resins is the isobutylated melamine/formaldehyde resin of Example 1; another is an n-butylated urea/formaldehyde resin solution of 60% (wt.) non-volatiles; a last one is a 50/50 blend of the latter urea/aldehyde resin with an n-butylated benzoquanamine/formaldehyde resin solution of 60% (wt.) non-volatiles. The formulations of the coatings on a non-volatiles basis and various physical and resistance qualities of the resulting thermoset films on phosphate iron panels are shown in the table below.

viding such acidity in the copolymer product, the latter can be essentially neutral and coatings containing same can be catalyzed at the time of application by incorporating added acids. When epoxyhydroxypolyether resin(s) are used in combination with our copolymer products to prepare thermosetting coating compositions, the copolymer products preferably are formulated from monomers which provide one to two carboxyl groups for each epoxy group which is provided by said epoxyhydroxypolyether resin(s).

In solutions which result from copolymerization of monomers in preparing our copolymer products, as well as in coating compositions which contain said copolymer products, we achieve good-shelf life (storage-stability) by including n-butyl alcohol and/or isopropyl alcohol in the solvent component. Such alcohol(s) should constitute about 20–50% by weight based on the total weight of the solvent component.

It will be understood that one or more of our copolymer products containing ester-linked hydroxyalkyl groups can be combined with one or more of the hydoxyl-containing resins (amine/aldehyde, phenol/aldehyde and/or epoxyhydroxypolyether resins). It will also be understood that for our purposes, the latter resins should be solvent-soluble; that is, the amine/aldehyde resins should be alkylated during preparation with substantially water immiscible alcohols, e.g., 4–10 carbon straight-chain, branched-chain and/or cyclic alkanols. Likewise, the phenols used in preparing the phenol/aldehyde resins should be nuclearly alkylated with alkyl substituents of 4–9 carbons.

Our finished blends of hydroxyalkyl-containing copolymer products with hydroxyl-containing resins can be used to provide clear thermosetting varnishes or can be pigmented with conventional pigments, fillers, extenders, etc.

| Materials | Coating Compositions | | | |
|---|---|---|---|---|
|  | E | F | G | H |
| Copolymer (above), g | 100 | 100 | 100 | 100 |
| Melamine/form. resin of Example 1, g | 17.0 |  |  |  |
| n-Butylated urea/form. resin (above), g |  | 31.5 | 37.5 |  |
| 50/50 mixed urea/form.-benzoguanamine/form. resin, g |  |  |  | 31.5 |
| Pigments, solvents, etc | (*) | (*) | (*) | (*) |
| Enamel Viscosity,[1] sec., inches | 45 | 44 | 41 | 38 |
| Pencil Hardness | 4H | 3H+ | 4H | 4H |
| Flexibility (inches)[2] | 4 | 0.25 | 0.50 | 4 |
| Impact (convex) | 5+ | 6 | 5+ | 5+ |
| Scratch Adhesion[3] | 4,100 | 3,400 | 3,700 | 3,200 |
| Mar Resistance | Good | Fair | Fair | Fair+ |
| 20° Gloss | 69.6 | 57.3 | 52.2 | 72.6 |
| 20° Gloss Retention[4] | 56.3 | 0.4 | 0.0 | 44.8 |
| Color Retention[5] | 3.81 | 4.99 | 5.82 | 4.65 |
| Stain Resistance | Very good | Good | Very good | Very good |
| Lard oil/Oleic acid (7 days) | 4H to 6H | 3H+ to 3H | 4H to 3H | 4H to 6H |
| 1% Detergent at 165° F., hrs.[6] | 396 | 96 | 93 | 192 |
| Enamel Stability at 140° F.[7] | Fair | Good | Good | Good |

[1] No. 4 Ford Cup at 80° F.
[2] Measured on conical mandrel; figure represents inches of failure from small end of bend.
[3] Figure represents weight in grams needed to scratch the film to the substrate.
[4] 20° Gloss values after film has been heated 16 hours at 350° F.
[5] Same as heat color retention of Table II.
[6] Hours to failure in a detergent solution composed of 13.5 g. sodium pyrophosphate, 7.05 g. sodium sulfate, 6.6 g. of an alkyl aryl sulfonate (Nacconal NRSF, $RC_6H_4SO_2Na$); 2.25 g. sodium metasilicate, 0.6 g. sodium carbonate, and water 3000 g.
[7] After 336 hours; based on increase in viscosity; "good" represents an increase of up to 12 seconds; "fair" represents an increase of 13–24 seconds (No. 4 Ford Cup, 80° F.).

*As in typical formula above.

In summary, it will be recognized that we have described and illustrated various ways to prepare solvent-soluble copolymer products which contain ester linked hydroxyalkyl groups and which therefore possess reactivity which can be used to cross-link the products with amine/aldehyde, phenol/aldehyde and/or epoxyhydroxypolyether resins. The copolymer products preferably possess at least moderate acidity resulting from (a) the use of hydroxyalkyl half esters and/or from inclusion in the copolymer of copolymerizable acids along with hydroxyalkyl full- and/or half-esters. Moderate acidity catalyzes the thermosetting reactions, but instead of proto give any desired degree of hiding and gloss. That is, the coatings can be glossy enamels, semi-gloss enamels or flat paints, and can be high-hiding, translucent, or metallescent in appearance.

The coatings of the invention can be used as primers and/or top coats carried on any substrate which is not harmed by the relatively-low baking temperatures employed to thermoset them, e.g. glass, metal, asbestos-cement products, glass-fiber products, etc. The coatings can be applied to such and other substrates in any of the conventional ways, as by brushing, spraying, roll-coating, etc. Apart from use in coating compositions, our hydroxy-reactive copolymer products can be used in preparing adhesives, impregnants, calking-putties and the like.

In preparing our hydroxyl-reactive copolymers for coating uses, we prefer to use 1–8 carbon alkyl esters of acrylic acid, methacrylic acid and/or itaconic acid (rather than the higher alkyl esters) alone and/or with styrene, vinyl toluene and/or acrylonitrile, since said short-chain esters improve average intercoat adhesion. For the same reason we prefer the hydroxyalkyl ether esters of 2–6 mols of added alkylene oxides. Nevertheless, coatings exhibiting satisfactory intercoat adhesion can be prepared without following the indicated preferences.

Having described our invention, what we claim is:

1. A thermosetting coating composition the liquid vehicle of which consists essentially of a homogeneous, single-phase solution in a volatile inert organic solvent component of: (A) at least one copolymer product prepared from copolymerizable monomeric compounds having ethylenic unsaturation and including monomeric hydroxyalkyl ether esters of acids selected from the group consisting of acrylic acid, methacrylic acid and itaconic acid, the hydroxyalkyl ether radicals of said esters conforming to the formula $HOR(OR^1)_nO$—, wherein R and $R^1$ are divalent hydrocarbon groups of 2–3 carbon atoms and can be the same or different, wherein $n$ is an integer having an average value between 2 and 8, and wherein the HO— group of the formula is selected from the group consisting of primary and secondary hydroxyls; and (B) hydroxyl-containing resins selected from the group consisting of alkylated melamine/formaldehyde, alkylated benzoquanamine/formaldehyde resins, heat-reactive $C_4$–$C_9$ alkyl-modified phenol/formaldehyde resins, and bisphenol/epichlorhydrin epoxyhydroxypolyether resins having a 1,2 epoxide equivalency up to about 525 grams; said copolymer product consisting essentially of copolymers of (a) 5–50% by weight of said hydroxyalkyl ether esters, (b) 0–94% by weight of 1–8 carbon alkyl esters of acids selected from the group consisting of acrylic acid and methacrylic acid, (c) 0–94% by weight of monomers having a $CH_2$=C< group and selected from the class consisting of styrene, vinyl toluene and acrylonitrile, and (d) 0–6% by weight of monomeric acids selected from the group consisting of acrylic acid, methacrylic acid and itaconic acid, the total of members (b), (c) and (d) in said copolymer products amounting to 50–95% by weight thereof; and the weight ratio of the copolymer product of (A) to the hydroxyl-containing resin solids of (B) being between about 70:30 and 85:15.

2. A coating composition as claimed in claim 1 which is pigmented with at least one pigment.

3. A coating composition as claimed in claim 2 wherein said copolymer product is acidic, has an acid number of about 20 based on the solids of said copolymer product, and includes n-butyl alcohol in the solvent component in amounts corresponding to 20–50%, based on the total weight of said component.

4. A coating composition as claimed in claim 3 wherein said copolymer product consists essentially of (a) 5–20% by weight of said hydroxyalkyl ether esters, (b) 60–20% by weight of said 1–8 carbon alkyl esters, (c) 35–60% by weight of said monomers having a $CH_2$=C< group, and (d) 2–4% by weight of said acids, and wherein the weight ratio of said copolymer product to hydroxyl-containing resins solids is about 4 to 1.

5. A coating composition as claimed in claim 4 wherein $n$ of said formula is between 2 and 6, and wherein R and $R^1$ of said formula contain 3 carbon atoms and are oxyalkylation residues of propylene oxide.

6. A solvent-soluble copolymer product having reactive hydroxyl groups and which consists essentially of copolymerized residues of: (a) 5–50% by weight of preformed monomeric hydroxyalkyl ether esters of acids selected from the group consisting of acrylic acid, methacrylic acid and itaconic acid; 0–94% by weight of 1–8 carbon alkyl esters of acids selected from the group consisting of acrylic acid and methacrylic acid, 0–94% by weight of monomers selected from the class consisting of styrene, vinyl toluene and acrylonitrile, and (d) 0–6% by weight of monomeric acids selected from the class consisting of acrylic acid, methacrylic acid and itaconic acid, the total of members (b), (c) and (d) in said copolymer product amounting to 50–95% by weight thereof; the hydroxyalkyl ether radicals of said hydroxyalkyl ether esters conforming to the formula $$HOR(OR^1)_nO—$$

wherein R and $R^1$ are divalent hydrocarbon radicals of 2–3 carbon atoms and can be the same or different, wherein $n$ is an integer between 2 and 8 inclusive, and wherein the HO— group of said formula is selected from the class consisting of primary and secondary hydroxyls.

7. A copolymer product as claimed in claim 6 where $n$ of said formula has a value of 2–6 and wherein R and $R^1$ of said formula contain 3 carbon atoms and are oxyalkylation residues of propylene oxide.

References Cited by the Examiner

UNITED STATES PATENTS

| 2,798,861 | 7/1957 | Segall et al. | |
|---|---|---|---|
| 2,877,264 | 3/1959 | O'Brien et al. | 260—86.1 XR |
| 2,945,835 | 7/1960 | Chapin et al. | 260—80.5 XR |
| 3,002,959 | 10/1961 | Hicks | 260—86.1 |
| 3,028,367 | 4/1962 | O'Brien | 260—86.1 |
| 3,059,024 | 10/1962 | Goldberg | 260—86.1 |
| 3,068,183 | 12/1962 | Strolle | 260—33.4 XR |

MORRIS LIEBMAN, *Primary Examiner.*

L. H. GASTON, *Examiner.*

J. E. CALLAGHAN, D. W. ERICKSON,
*Assistant Examiners.*